No. 636,698.     E. SCHÜRHOFF.     Patented Nov. 7, 1899.
CONNECTING BRACKET FOR CYCLE OR LIKE FRAMES.
(Application filed Mar. 29, 1898.)
(No Model.)
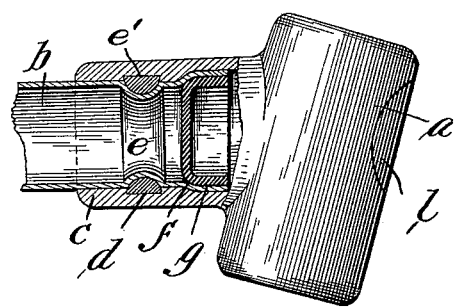
Attest,
Waller Donaldson
C. Middleton
Inventor
Eduard Schürhoff
by Richards & Co.
Attys.

UNITED STATES PATENT OFFICE.

EDUARD SCHURHOFF, OF MAGDEBURG-BUCKAU, GERMANY.

CONNECTING-BRACKET FOR CYCLE OR LIKE FRAMES.

SPECIFICATION forming part of Letters Patent No. 636,698, dated November 7, 1899.

Application filed March 29, 1898. Serial No. 675,595. (No model.)

*To all whom it may concern:*

Be it known that I, EDUARD SCHÜRHOFF, a subject of the Emperor of Germany, and a resident of Magdeburg-Buckau, in the Kingdom of Prussia and Empire of Germany, have invented a new and useful form of Connecting-Bracket for Tubular Members of Cycle-Frames or the Like, of which the following is a specification.

The object of the invention is to provide a strong, durable, and effective joint in which all brazing of the parts shall be dispensed with, thus rendering the assembling of the parts easier and doing away with the disadvantages arising from heating the parts.

The invention is illustrated in the accompanying drawing, in which the joint is shown in section.

In the drawing, $a$ represents the socket-piece, to the member or arm $c$ of which the tube $b$ is to be connected. The portion $c$ is provided with a groove $e'$ in its inner face, in which is sprung a ring of suitable spring material, which is placed upon the tube $b$ at a suitable distance from its end before the tube is inserted. The socket also has a recessed portion $f$. The tube $b$ is then forced into the socket, the ring $d$ springing into the groove, and a suitable expanding mandrel is introduced through an opening $l$ in the socket-piece, and the end of the tube is expanded out to the diameter of the recessed portion $f$ of the socket. A plug $g$ is then placed in the expanded end of the tube, after which the opening $l$ may be closed in any suitable manner.

Having thus described my invention, what I claim is—

In a joint for cycle-tubes, the combination of the socket $e$ having an annular groove $e'$ and inner recess $f$ in its inner face, the spring-ring located in said groove, the tube extending into the recess through the ring and having a reduced portion corresponding to the ring, the end of the tube beyond the ring being expanded to fit the recess $f$ and the plug $g$ in the expanded end of said tube, substantially as described.

In witness whereof I have hereunto set my hand in presence of two witnesses.

EDUARD SCHÜRHOFF.

Witnesses:
RICH. SCHRITTO,
WILH. SCHOMBARDT.